United States Patent [19]

Langlais et al.

[11] 4,333,007
[45] Jun. 1, 1982

[54] METHOD AND APPARATUS FOR DETERMINING FOCUS DIRECTION AND AMOUNT

[75] Inventors: Richard A. Langlais, Littleton; Francis T. Ogawa, Lakewood; Dennis J. Wilwerding, Littleton, all of Colo.

[73] Assignee: Honeywell Inc., Minneapolis, Minn.

[21] Appl. No.: 168,225

[22] Filed: Jul. 10, 1980

[51] Int. Cl.³ .................................................. G01J 1/20
[52] U.S. Cl. ...................................... 250/201; 250/204; 354/25
[58] Field of Search ............... 250/201, 204, 209, 578; 354/25; 356/4, 141, 152

[56] References Cited

U.S. PATENT DOCUMENTS

| | | | |
|---|---|---|---|
| 4,083,056 | 4/1978 | Nakamura et al. | 250/201 |
| 4,185,191 | 1/1980 | Stauffer | 354/25 |

*Primary Examiner*—David C. Nelms
*Attorney, Agent, or Firm*—Charles J. Ungemach

[57] ABSTRACT

A system for determining the range to an object utilizing a plurality of radiation responsive detectors arranged in groupings wherein a first grouping of detectors receives radiation from the object in a first pattern and the second grouping of detectors receives radiation from the object in a second pattern. The patterns move with respect to one another as the distance between the object and the system changes. The range is determined from a determination of the relative position of the patterns by computing where the patterns will coincide if the focusing lens of the system is moved. The output is a signal having a characteristic indicative of the desired direction of motion of the lens and a characteristic indicative of the amount of such motion necessary to produce a proper focus condition.

10 Claims, 8 Drawing Figures

METHOD AND APPARATUS FOR DETERMINING FOCUS DIRECTION AND AMOUNT

BACKGROUND OF THE INVENTION

In a U.S. Pat. No. 4,185,191, issued Jan. 22, 1980 to Norman L. Stauffer and assigned to the assignee of the present invention, a range determination system is shown which is useable in a through-the-lens camera for positioning the taking lens at a desired correct focus position with respect to a remote object within the field of view. That system utilizes a plurality of small detectors such as charge coupled devices (CCD) or charge injection devices (CID) mounted in an array to receive radiation from the scene being viewed. The detectors are arranged in pairs with each pair being mounted behind a small lenslet so that each pair receives a view of the exit pupil of the taking lens but one of the detectors in each pair receives radiation primarily from a first portion of the taking lens while the other of the detectors in each pair receives radiation primarily from a different portion of the taking lens. The result is to create two similar curves indicative of the radiation distribution pattern from the scene being viewed. At the proper focus position, the two curves coincide, but as the object changes position with respect to the camera, the two curves move with respect to each other to indicate an out-of-focus situation. The two curves move with respect to each other in a first direction when the object is closer to the camera than the desired focus position and move in an opposite direction with respect to each other as the object moves further from the camera than the desired focus position. By determining the direction of movement of the two curves with respect to each other, it is therefore possible to determine the direction that the taking lens has to be moved to achieve the desired focus position.

In a copending application of Norman L. Stauffer and Dennis J. Wilwerding, Ser. No. 16,595, now U.S. Pat. No. 4,249,073 and assigned to the assignee of the present invention, an improvement on the above-mentioned U.S. Pat. No. 4,185,191 was disclosed wherein a method and apparatus for determining the direction in which the two similar curves need to be moved in order to produce the coincidence indicative of a proper focus position is described. In that application, a value indicative of the slope of the curves at predetermined points is obtained and this value is multiplied by the difference in the value of the output of the detectors at such points. The product is summed over a predetermined range. The summation value is substantially zero when the two curves coincide but will have a characteristic such as plus or minus to indicate the direction the taking lens must be moved when the two curves do not coincide.

In a copending application of James D. Joseph and Dennis J. Wilwerding, Ser. No. 58,964, filed July 20, 1979, now U.S. Pat. No. 4,250,376 and assigned to the assignee of the present invention, a further improvement was disclosed which eliminated the need for obtaining a product and in lieu thereof operates to (1) produce a first signal representative of the absolute magnitude of the difference between the outputs of two detectors, one from each of the curves, (2) produce a second signal indicative of the absolute magnitude of the difference between the outputs of two other detectors, one from each of the curves, and (3) subtract the two signals and then sum the result over a predetermined range. The resultant summation value, as in the case of the above-mentioned copending application, Ser. No. 16,595, is substantially zero when the two curves coincide, will have a first characteristic such as a negative sign when the two curves are displaced in the first direction and a second characteristic such as a positive sign when the two curves are displaced in the opposite direction.

While the above patents and applications describe circuitry that is satisfactory to determine the direction in which the taking lens must be moved in order to achieve a proper focus position, it does not produce a signal which can be used to determine the amount of movement that taking lens has to be moved from its present position in order to arrive at the proper focus position. Knowing both the direction of movement and the amount of movement necessary to achieve a proper focus position has a number of advantages including the ability to operate the taking lens in a proportional manner, that is, to move the taking lens very rapidly to a position near the proper focus position and thereafter slowing the taking lens movement down so that it approaches the exact focus position without overshoot or oscillation. Such a system may also be used to provide the photographer with an indication of the amount the taking lens is presently out-of-focus which information may be more useful to a photographer than merely knowing the direction the taking lens needs to be moved.

SUMMARY OF THE INVENTION

The apparatus of the present invention utilizes the basic principals described in the above-referred to copending application Ser. No. 58,964 but rather than obtaining a single resultant summation value indicative of the relative position between the taking lens in its present position and the desired focus position, the present invention electronically simulates the positioning of the taking lens at a number of positions throughout its range and determines for each of the simulated positions a resultant summation value that would occur should the lens be in the simulated position. By plotting the various summation values obtained at the simulated positions, a curve may be generated which has a maximum change of slope at the desired focus position. The present system analyses the summation curve, determines the position of maximum slope and from knowing the number of simulated shift positions that it took to arrive at the maximum slope position an indication of the amount and direction the lens must be moved to achieve proper focus position is obtained.

DETAILED DESCRIPTION OF THE PREFERRED EMBODIMENTS

Figure 1:
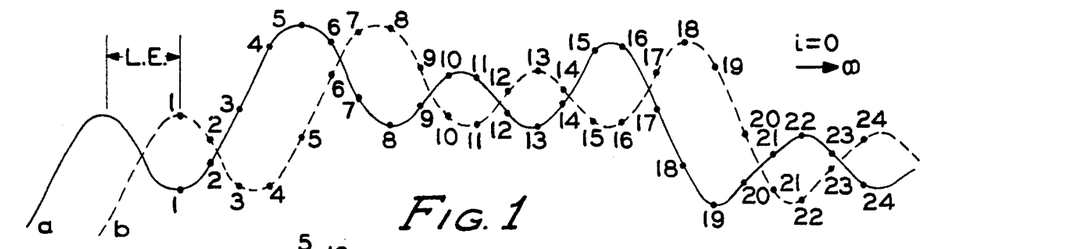
FIG. 1 shows two curves representing the spatial distribution pattern that might be produced by an auto focus system when the taking lens is out of the proper focus position by a predetermined amount.

In the above-referred to copending application Ser. No. 58,964, it was shown how, by utilizing a plurality of detector pairs which receive radiation from a remote object, curves may be produced which are displaced from one another when an out-of-focus condition exists. The curves are generated by taking the values of the outputs of the detector pairs plotted against the position of the detector pairs in the array. In the present invention, the same principle is employed. For purposes of explanation, it will be assumed that 24 detector pairs are used in the array and a first one of the detectors in each pair will be identified by the reference numeral "a" while the second of the detectors in each pair will be identified by the reference numeral "b". Subscripts 1-24 will be used to identify the specific detectors under consideration. In FIG. 1, it has been assumed that the present position of the taking lens in the system is away from the proper focus position by an amount "L.E." representing lens extension. It is seen that the curve of the output of detectors "a" in each detector pair is shifted with respect to the curve of the output of detectors "b" in each detector pair to the left by the amount L.E. in FIG. 1. The individual outputs from the detectors in each pair along curves a and b are identified by the positions marked 1-24 in FIG. 1. FIG. 1 represents the situation as it might exist prior to there being any electronic shifting of one curve with respect to the other. As will be explained in greater detail below, one of the curves, for example curve b, will be electronically shifted with respect to the other of the curves, curve a, and the summation values taken in a manner like that described in connection with the above-referred to copending application Ser. No. 58,964 at each shifted position. The amount of shift from one position to another is arbitrarily set at a value identified as P representing the lens motion necessary to shift a curve by an amount equal to the distance between adjacent detectors on the curves as will be discussed below. The number of shifted positions of curve b with respect to curve a, or vice versa, will be identified by "i" which is seen in FIG. 1 is equal to zero indicating that no shifting has occurred.

Figure 2:
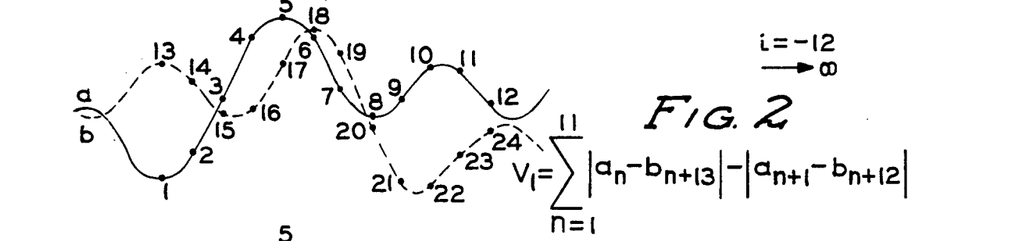
FIG. 2 shows the spatial distribution pattern like that of FIG. 1 but with one of the curves shifted to the left 12 positions.

FIG. 2 shows the curves of FIG. 1 except that curve b has been shifted 12 positions (a distance equal to twelve times the distance between adjacent detector pairs) to the left of curve a and this direction is arbitrarily given a negative sign. Accordingly, in FIG. 2, i is equal to −12. Since the total array contains 24 detector pairs, it is not possible to compare the outputs of all 24 detectors when one of the curves has been shifted with respect to the other. Accordingly, in FIG. 2, it will be noticed that curve a shows only the outputs of the first 12 of its detectors numbered 1-12 while curve b shows the outputs of the last 12 of its detectors numbered 13-24. These outputs are the only ones that overlap when curve b has been shifted 12 positions with respect to curve a and the outputs of detectors 13-24 of curve a have no counterparts on curve b and the outputs of detectors 1-12 of curve b have no counterparts in curve a. Accordingly, when the summation value is taken in a manner similar to that described in the above-referred to copendng application Ser. No. 58,964, the resultant summation equation is as shown in FIG. 2

$$V_1 = \sum_{n=1}^{11} |a_n - b_{n+13}| - |a_{n+1} - b_{n+12}|$$

As will be described, the result of this summation, $V_1$, will be stored for future use in a memory.

Figure 3:
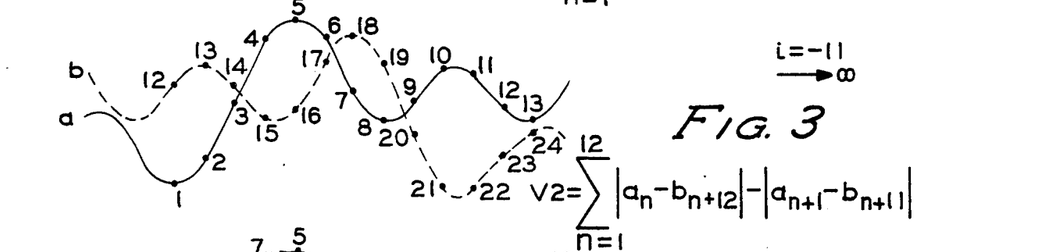
FIG. 3 shows the spatial distribution pattern like that shown in FIG. 2 but with the shifted curve moved one position to the right.

After the summation value $V_1$ has been obtained from the representation shown in FIG. 2, curve b is moved one position to the right with respect to curve a and accordingly i = −11 as seen in FIG. 3. With curve b shifted 11 positions from the way it was in FIG. 1, there are now 13 detector outputs in each curve which find corresponding overlapping counterparts in the other curve. Accordingly, curve a is shown in FIG. 3 with the outputs of detectors numbered 1-13 while curve b is shown in FIG. 3 with the outputs of detectors 12-24. A new summation value $V_2$ is obtained from the condition shown in FIG. 3 according to the equation $$V_2 = \sum_{n=1}^{12} |a_n - b_{n+12}| - |a_{n+1} - b_{n+11}|$$

This value $V_2$ is also stored in the memory for use in determining the proper focus position as will be described below.

After the summation value $V_2$ is obtained in FIG. 3, the curve b is again shifted one position to the right so that i will now equal −10. In this position, although the curves are not shown in the drawings, there will be outputs from 14 detectors of each of the two curves that overlap and a new summation value $V_3$ will be obtained according to the equation $$V_3 = \sum_{n=1}^{13} |a_n - b_{n+11}| - |a_{a+1} - b_{n+10}|$$

and the new value $V_3$ will be again stored in the memory as will be explained below. This process continues with consecutive shifts of curve b one position to the right of curve a all away across the entire range. i will consecutively become larger and larger from the −12 shown in FIG. 2 through the zero condition shown in FIG. 1 at which time i starts becoming positive and the shifts continue until i is equal to +12.

Figure 4:
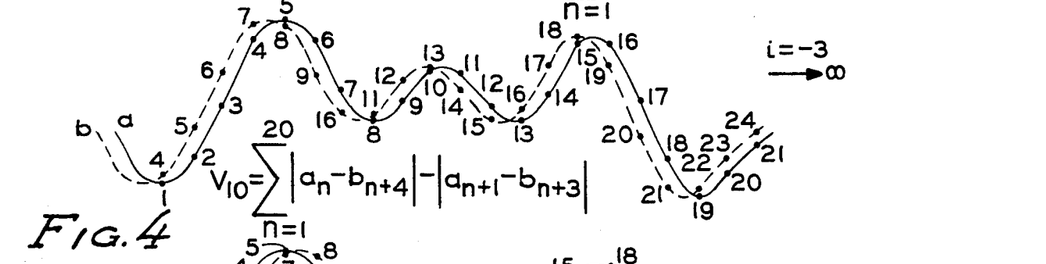
FIG. 4 shows the spatial distribution pattern similar to FIG. 3 but with the shifted curve moved eight more positions to the right.

FIG. 4 shows the situation when curve b of FIG. 1 has reached the position where i = −3 and it is seen that curve b is now just slightly to the left of curve a with the outputs of 21 detectors overlapping. In this situation, the summation value $V_{10}$ is given by the equation $$V_{10} = \sum_{n=1}^{20} |a_n - b_{n+4}| - |a_{n+1} - b_{n+3}|$$

Figure 5:
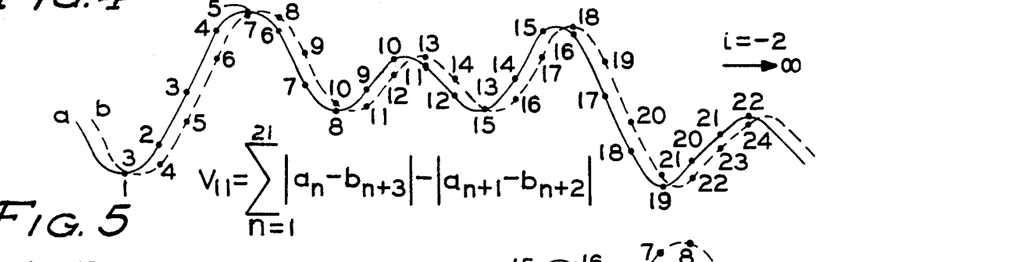
FIG. 5 shows the spatial distribution pattern like that of FIG. 4 but with the shifted curve moved one additional position to the right.

FIG. 5 shows the situation where i = −2 and it is now seen that curve b is slightly to the right of curve a. This indicates that the proper focus position would occur somewhere between the position $i=-3$ and $i=-2$ since the coincidence of the two curves would have occurred between the representation shown in FIG. 4 and the representation shown in FIG. 5. In FIG. 5, there are 22 outputs of the detector pairs that overlap and the value for $V_{11}$ is given by the equation $$V_{11} = \sum_{n=1}^{21} |a_n - b_{n+3}| - |a_{n+1} - b_{n+2}|$$

The process of shifting curve b one position to the right each time continues past the condition where $i=0$; i.e., when the curves again have the position shown in FIG. 1. At this time, the outputs of all 24 detectors overlap and the value of $V_{13}$ is given by the equation $$V_{13} = \sum_{n=1}^{23} |a_n - b_{n+1}| - |a_{n+1} - b_n|$$

which can be seen to correspond with equation (3) of the above-referred to copending application Ser. No. 58,964.

As curve b is shifted one position to the right from the situation shown in FIG. 1, i will equal $+1$ and there will again be 23 detector outputs which overlap and can be used in the summation equation. These detectors would be the a detectors 2-24 and the b detectors 1-23.

Figure 6:
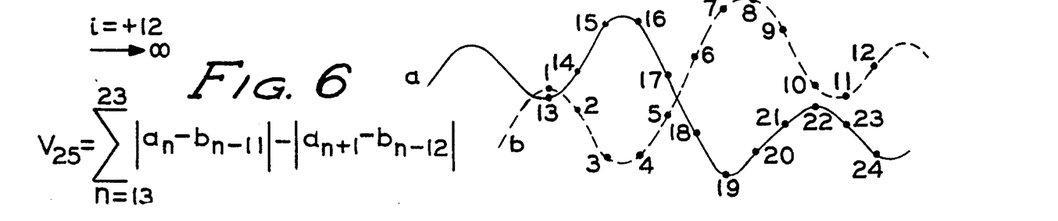
FIG. 6 shows the spatial distribution pattern like FIG. 5 but with the shifted curve being displaced an additional 14 positions to the right.

The shifting of curve b with respect to curve a continues until the situation shown in FIG. 6 is reached where i is equal to $+12$. In this condition, curve b is 12 positions to the right of curve a as it was represented in FIG. 1 and the overlapping detector outputs are from detectors 13-24 in curve a and from detectors 1-12 in curve b. In this situation, the summation value $V_{25}$ is given by the equation $$V_{25} = \sum_{n=13}^{23} |a_n - b_{n-11}| - |a_{n+1} - b_{n-12}|$$

The obtaining of the various V values in each of the shifts above is accomplished with a summation equation similar to that shown in the above-referred to copending application Ser. No. 58,964. A more general equation for representing the value of V as a function of i throughout the entire shifting process can be given by the equation $$V_i = \sum_{n=1+\frac{i+|i|}{2}}^{(N-1)+\frac{i-|i|}{2}} |a_n - b_{n+1-i}| - |a_{n+1} - b_{n-i}| \quad (1)$$

where N is the total number of detector pairs. Using equation (1), the value for any $V_i$ may be obtained by substituting appropriate values of i into the summation.

The process of shifting curve b with respect to curve a as described above to produce the various simulated radiation distribution patterns shown in FIGS. 1 through 6 is not exactly the same as would occur if the taking lens were actually physically shifted to these various positions because FIGS. 1 through 6 show the curves shifted without change of shape or amplitude from their original position while if the lens were physically moved, the radiation distribution actually received would cause the shape of the curves to differ somewhat from those shown in FIGS. 1 through 6. It has been found, however, that the crossover point will be quite near the actual proper focus position. Furthermore, after the lens extension value is obtained and the lens begins to move towards the proper focus position, the above process will normally be repeated and the closer the lens gets towards the proper focus position, the more accurate will be the representation.

Figure 7:
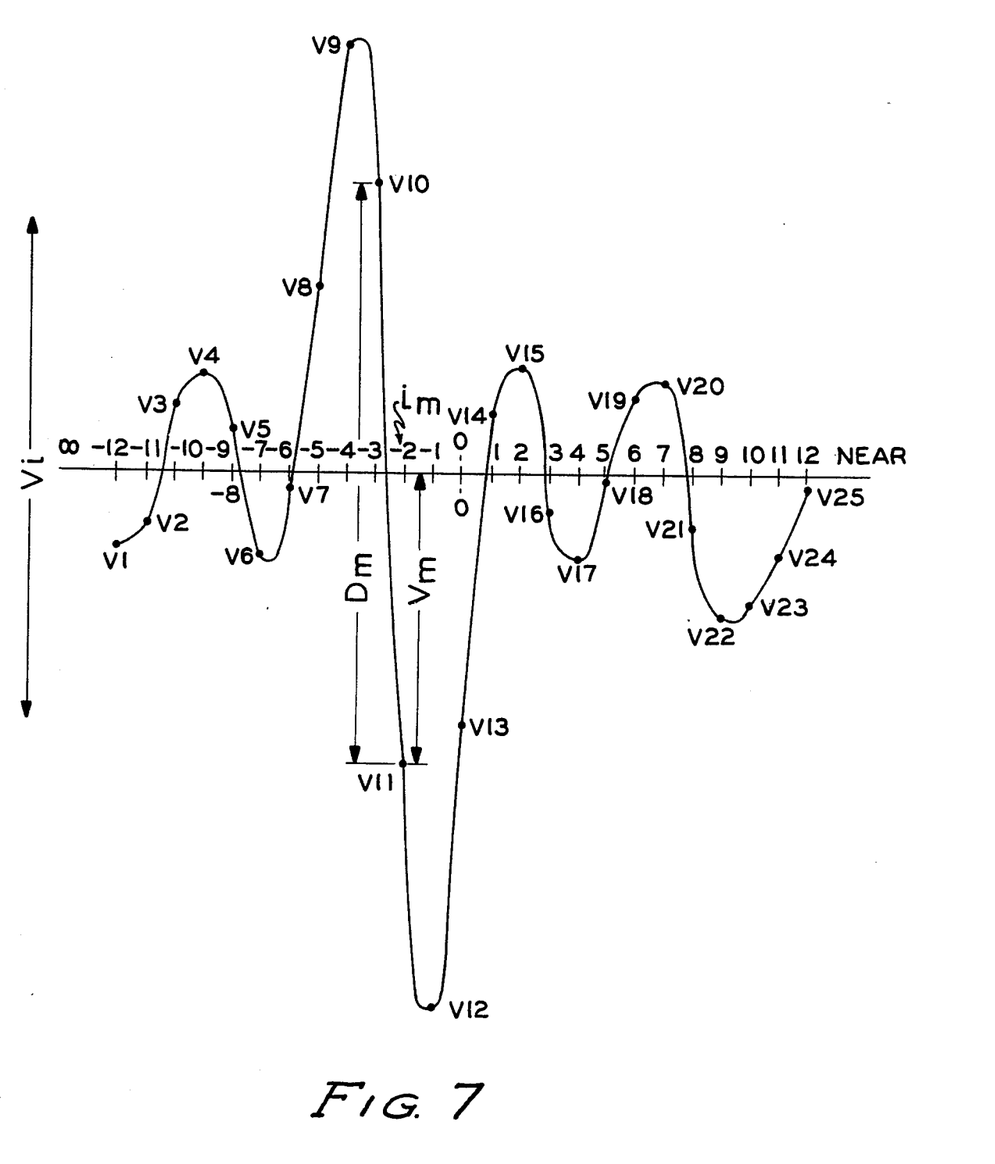
FIG. 7 shows a graph of the resultant summation values that are obtained as the shifted curve of FIGS. 1-6 are shifted throughout the entire range.

FIG. 7 shows a plot of the various V values obtained from $V_1$-$V_{25}$ as a function of i. It should be noticed that with the curves that were chosen to depict the spatial distribution pattern in FIG. 1, the curve of FIG. 7 moves from a negative side to a positive side several times during the entire procedure. It should also be noticed that the largest difference in value between two consecutive values occurs between $V_{10}$ and $V_{11}$. This largest value, representative of the most negative slope for the curve, is identified in FIG. 7 as $D_m$ and the crossover of the axis occurs between $i=-2$ and $i=-3$. In the apparatus to be discussed below, the exact crossover point will be determined utilizing this largest slope value $D_m$ as well as the V value and the i value with which it is associated. These values are shown in FIG. 7 as $V_m$ and $i_m$ respectively. The exact position between $i=-2$ and $i=-3$ can be determined from the equation $$L.E. = P(V_m/D_m + i_m)$$

(2) where P is the amount of movement of the taking lens necessary to shift the curves by an amount equal to the distance between detector pairs.

As will be discussed below, the values for V obtained through each of the shift positions will be stored in a memory and the difference between consecutive V values will be obtained so as to determine which of these has the largest variation $D_m$. At the same time, the i values and V values with which they are associated are stored so that the apparatus will be able to determine how far from the zero position the crossover point exists for purposes of positioning the taking lens of the camera. As can be seen from FIG. 7, the crossover occurs at about $-2.5$ from the zero position which represents the present lens position and accordingly, the taking lens of the camera would have to be moved $2\frac{1}{2}$ i positions toward the "infinity" position where the lens will be properly focused.

Figure 8:
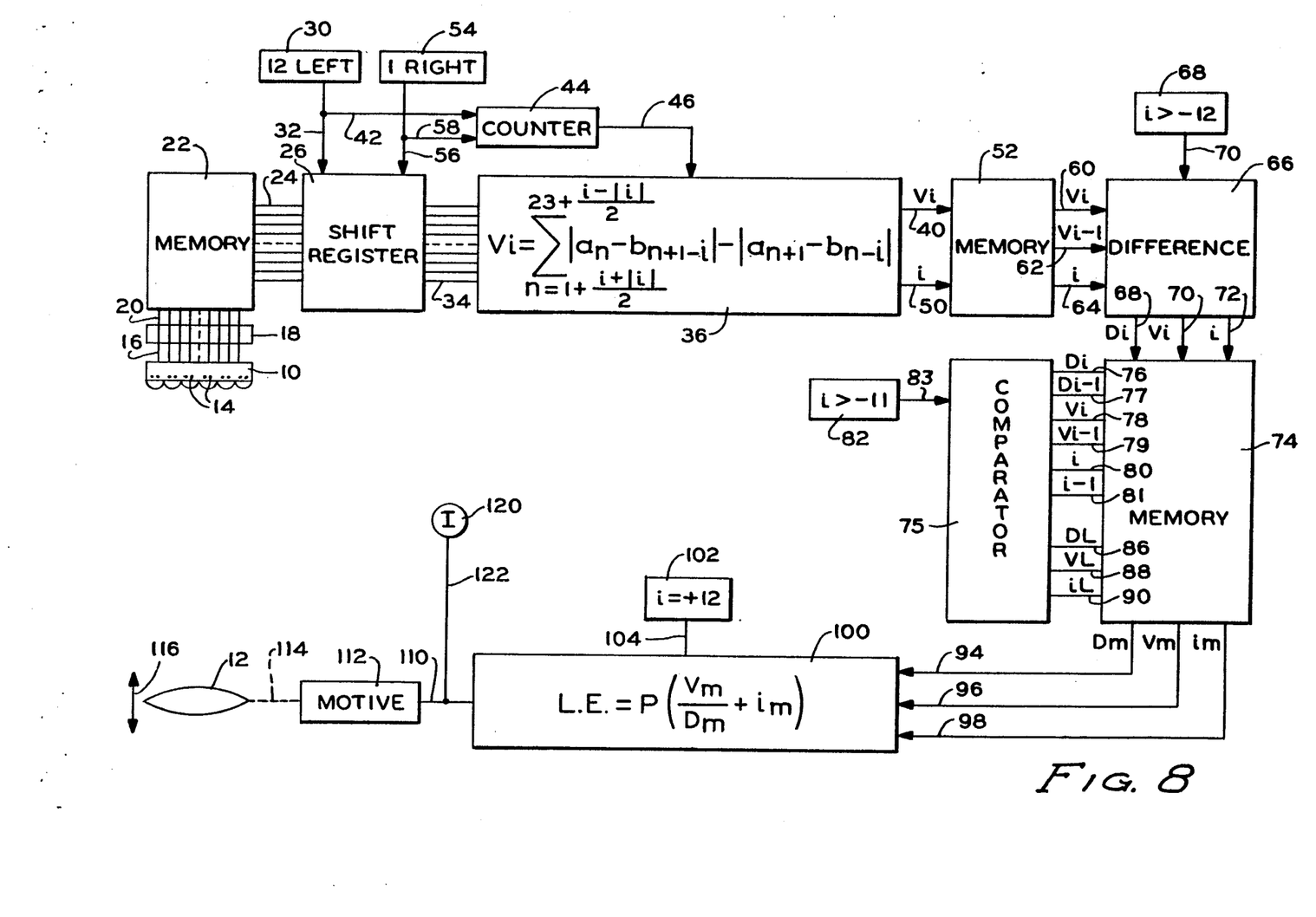
FIG. 8 shows a block diagram of the circuitry used to determine the direction and amount of taking lens motion necessary to achieve proper focus position.

FIG. 8 shows, in block diagram form, the circuitry used in determining the crossover point of the maximum negative slope of FIG. 7. In FIG. 8, the lenslet and detector array 10 is shown positioned so as to receive radiation from an object remotely located through the taking lens 12 of a camera. The individual detector pairs are shown as dots such as 14 in detector array 10 and each of the detectors in the array 10 is connected by a conductor such as conductor 16 to an A/D converter 18. A/D converter 18 operates to convert the magnitude of the signals which represent the intensity of radiation received by each detector from an analog to a digital signal which signals are presented by conductors such as 20 to a first memory 22 for storage. Of course, the array 10, detectors 14 and other components of the circuit herein described, may be manufactured as solid state devices obviating the use of individual conductors such as 16. Memory 22 stores the digital words representing the magnitude of the signals from each of the detectors and presents them by conductors such as 24 to a shift register 26. Each of the detector pairs in detector array 10 contains two detectors one of which will be identified as the a detector while the other is identified as the b detector. As was explained in the above-referred to copending application Ser. No. 58,964, the outputs of the a detectors and the outputs of the b detectors in array 10 can be plotted to form two curves which move one with respect to the other as the remote object changes position with respect to the camera. When lens 12 is in the proper focus position, these two curves coincide. The positions of the digital words in memory 22 from the a and b detectors are such that they would initially provide curves such as shown in FIG. 1.

A signal, which may be instigated by a clock pulse (not shown), from a device 30, identified by the inscription "12 Left", along a line 32 to shift register 26 causes the shift register 26 to move the locations of the outputs corresponding to b detectors 12 positions to the left so that upon the operation of device 30 the output from shift register 26 on conductors such as 34 would be as shown in FIG. 2. These signals on conductors such as 34 are presented to a computer 36 which operates to take the summation found in equation (1) above to produce a value $V_i$ at its output on conductor 40 which in the first instance would be the value $V_1$ obtained from the equation shown in FIG. 2. A signal from device 30 along conductor 42 to a counter 44 operates to produce an output from counter 44 on a conductor 46 representative of the 12 shifts to the left so that the signal on conductor 46 would be representative of a value $i = -12$. Conductor 46 is also connected to computer 36 so that when the signal $V_1$ appears on line 40, the value $i = -12$ appears on an output from computer 36, identified by reference numeral 50. The signals on lines 40 and 50 are presented to a second memory 52 for storage. While memory 52 is shown as a separate memory in FIG. 8, it may, of course, be a part of the memory 22. The two values $V_i$ and i are now stored in memory 52 but since there is no other $V_i$ with which to compare it, nothing further happens at this time. After $V_i$ and i have been presented to memory 52 for storage, a signal, which also may be instigated from a clock pulse (not shown), from a device 54, identified by the inscription "1 Right", is presented along a conductor 56 to the shift register 26. The signal from device 54 operates in shift register 26 to shift the positions of the values for the b detectors one position to the right so that the signals appearing on line 34 from shift register 26 would be representative of the conditions such as shown in FIG. 3. At the same time, the signal from device 54 is presented by conductor 58 to counter 44 so that the output on conductor 46 would now be representative of an $i = -11$.

Computer 36 again operates with the signals appearing on lines such as 34 and the i value on line 46 to perform the summation and obtain a second $V_i$ value which will be presented by conductor 40 to memory 52 while the new i value is presented on conductor 50 to memory 52. The previous $V_i$ value now becomes $V_{i-1}$ in memory 52 and the signals $V_i$ and $V_{i-1}$ along with the present i value of $-11$ are presented by conductors 60, 62 and 64 to a difference device 66. A device 68, identified by the inscription "i > -12", which may be connected to counter 44, produces a signal on a conductor 70 to the difference device 66 whenever i is greater than $-12$ and thus causes difference device 66 to operate on $V_i$ and $V_{i-1}$ to produce a first difference value or slope value $D_i$ signal on a line 68 representative of $V_i - V_{i-1}$. This first slope value on line 68 is accompanied by an output from difference device 66 representative of $V_i$ on a line 70 and the most recent i value on a line 72 and these signals are presented to a third memory 74 for storage. Here again, memory 74 is shown as a separate memory but in actual practice may be combined with the memories 22 and 52. Since there is no other $D_i$ value for comparison purposes, nothing further happens at this point and an additional signal from device 54 on conductor 56 to shift register 26 causes another shift of the b signals one position to the right and causes counter 44 to produce an output on conductor 46 representative of an $i = -10$.

The above-described operation is again performed and a new $V_i$ is presented along with the most recent i value on lines 40 and 50 respectively to memory 52. Since i is still greater than $-12$, a signal from device 68 on conductor 70 to difference device 66 causes difference device 66 to compare the new $V_i$ value with the last most recent $V_i$ value now identified as $V_{i-1}$. Difference device 66 produces a new $D_i$ on conductor 68 along with the new $V_i$ and i values on conductors 70 and 72 to memory 74. Memory 74 now contains the old $D_i$ value now identified as $D_{i-1}$ and the new $D_i$ value as well as the $V_i$, $V_{i-1}$, i and i−1 values associated with the two D values respectively. These values are presented to a comparator 75 by conductors 76-81 respectively.

Since i is now greater than $-11$, a device 82 identified by the inscription "i > -11", which also may be connected to counter 44, presents a signal on a conductor 83 to comparator 75 which compares the magnitude of the $D_i$ and the $D_{i-1}$ value and determines which of these two values is the most negative. The most negative of the two slope values, identified in FIG. 8 as $D_L$, is presented by a conductor 86 back to memory 74 where $D_L$ is substituted for the $D_i$ value previously existing in memory 74 and the old $D_{i-1}$ value is discarded. The V and i values, identified as $V_L$ and $i_L$ associated with $D_L$ are also presented by conductors 88 and 90 respectively back to memory 74 where $V_L$ replaces $V_i$ and $i_L$ replaces i with $V_{i-1}$ and i−1 being discarded. Memory 74 now contains a new $D_i$ value equal to the $D_L$ value or largest negative slope obtained by comparator 84 and the $V_i$ and i values with which it is associated.

A further signal from device 54 along conductor 56 agains shifts the values for the b detectors one position to the right and operates through counter 44 to change the i value to $-9$. Again computer 36 operates to obtain a new $V_i$ value and this along with the present i value are presented by conductors 40 and 50 to memory 52. Since i is still greater than $-12$, difference device 66 again obtains a difference value between $V_i$ and $V_{i-1}$ to produce a new $D_i$ on conductor 68 along with the $V_i$ and i values with which it is associated on conductors 70 and 72 respectfully. Memory 74 now contains a new $D_i$, $V_i$ and i value and the old $D_L$, $V_L$ and $i_L$ values which have now been moved to a position representative of $D_{i-1}$, $V_{i-1}$ and i−1 respectively. Again, since i is still greater than $-11$, a signal from device 82 on conductor 83 causes comparator 75 to compare these two D values and to produce a new $D_L$ value on conductor 86 back to memory 74 where it again replaces the $D_i$ value previously stored there. The new $V_L$ and $i_L$ values are also presented on conductors 88 and 90 to memory 74.

Device 54 continues to produce signals on conductor 56 so that shift register 26 moves the b output value one position to the right and computer 36 computes the summation value $V_i$ for each new shift. The result is that memory 74 continues to receive $D_L$ values which represent the most negative of the slope values obtained by comparator 75 and the $V_L$ and $i_L$ with which the $D_L$ is associated. The process continues until the i value from counter 44 reaches a +12 in which case the b curve has been shifted to the right enough times that it occupies the position 12 shifts to the right as is shown in FIG. 6. After comparator 75 has determined the largest of the D values in this last iteration of the process, memory 74 will contain the most negative of all of the D values, $D_m$, and the V and i values with which it is associated, $V_m$ and $i_m$. The $D_m$, $V_m$ and $i_m$ are presented by conductors 94, 96 and 98 to a second computer device 100 which, although shown as separate computer from computer 36, may again be all part of the same unit. A signal from a device 102, identified by the inscription "i = +12" which may also be connected to counter 44 is presented by a conductor 104 to computer 100 so that computer 100 may perform the calculation of equation (2) above. In this equation L.E. represents the necessary lens extension which must be accomplished from present position of the lens in order to bring it into a proper focus position. P is a constant representing the lens extension in millimeters per shift and, as explained above, $V_m$, $D_m$ and $i_m$ are the maximum values associated with the greatest negative slope obtained by comparator 84. The result is a signal on a conductor 110 representative of the value L.E. which signal is presented to a motive device 112 which is the lens driving device of the camera connected by a mechanical connection such as 114 to the lens 12. Motive device 112 moves lens 12 in a direction towards or away from the lens array 10 as shown by arrows 116 to a position where the lens 12 is in a proper position to focus the image of the remote object on the detector array 10. If the value for L.E. is negative, then the lens will be moved downwardly in FIG. 8 towards the near position while if the value for L.E. is positive, lens 12 will be moved upwardly in FIG. 8 towards the infinity position.

An indicator 120 is shown connected to the output of computer 100 by a conductor 122. Indicator 120 may be used to display to the photographer the amount and direction by which his taking lens is displaced from the proper focus position.

As the motive means 112 moves lens 12 towards the proper focus position, the radiation pattern received by detector array 10 changes so that the values of the outputs of the a and b detectors changes and memory 22 stores different values therefore. As the motive means moves the lens to near the proper focus position, an additional set of values may be shifted through the shift register 26 and computed by the computer 36 to give yet a more accurate position for the precise focus position. In doing this, it may be desirable to stop the motion of lens 12 momentarily or if the process is rapid enough, it may be accomplished while the lens is moving.

It is therefore seen that I have provided a method and apparatus for positioning the lens of a optical system at the desired position for proper focus of a remote object and have done so by providing an indication of not only the direction the lens needs to be moved but also of the amount necessary for such movement. Many obvious changes will occur to those skilled in the art and I do not wish to be limited by the specific disclosures used in connection with describing the preferred embodiment. I intend only to be limited by the following claims.

The embodiments of the invention in which an exclusive property or right is claimed are defined as follows:

1. Apparatus for use with an auto focus system which includes lens means that produces first and second radiation distribution patterns of a scene to be focussed upon, the patterns being similar and in a first relative position when the lens means is in a proper focus position with respect to the scene, the patterns moving away from the first relative position in a first relative direction as the relative position of the scene and the lens means changes from the proper focus position in one direction and the patterns moving away from the first relative position in a second relative direction as the relative position of the scene and the lens means changes from the proper focus position in a direction opposite to the one direction comprising, in combination:

a first plurality of radiation detectors positioned to receive the first radiation distribution pattern, each radiation detector in the first plurality of radiation detectors operable to produce an output indicative of the radiation received thereby;

a second plurality of radiation detectors positioned to receive the second radiation distribution pattern, each radiation detector in the second plurality of radiation detectors operable to produce an output indicative of the radiation received thereby, each radiation detector in the second plurality of radiation detectors having a positionally corresponding radiation detector in the first plurality of radiation detectors so that, when the lens means is in a proper focus position, the output of each radiation detector in the second plurality of radiation detectors is substantially equal to the output of its positionally corresponding radiation detector in the first plurality of radiation detectors;

shift register means connected to receive the outputs of the radiation detectors in the first and second plurality of radiation detectors and operable to shift the outputs of the radiation detectors in one of the plurality of radiation detectors with respect to the outputs of the positionally corresponding radiation detectors in the other of the plurality of radiation detectors;

signal receiving means connected to the shift register means to receive the outputs of the radiation detectors in the first and second plurality of radiation detectors and to produce a plurality of consecutive outputs, $V_i$, in accordance with the expression $$V_i = \sum_{n=1+\frac{i+|i|}{2}}^{(N-1)+\frac{i-|i|}{2}} |a_n - b_{n+1-i}| - |a_{n+1} - b_{n-i}|$$

where N is the number of radiation detectors in the first plurality of radiation detectors, n is any number of 1 to N, a represents the output of individual radiation detectors in the first plurality of radiation detectors, b represents the output of individual radiation detectors in the second plurality of radiation detectors and i represents the number of shifts of the shift register from $-N/2$ to $+N/2$;

difference means connected to the signal receiving means to receive each two consecutive values of $V_i$ and to produce consecutive outputs, $D_i$, representative of the difference therebetween;

storage means connected to the difference means to receive and store the outputs $D_i$;

comparator means connected to the storage means to receive the latest value of $D_i$ and the largest $D_i$ value previously stored in the storage means and to produce an output $D_L$ representative of the largest $D_i$ compared;

means connecting the comparator means to the storage means to substitute the $D_L$ output for the largest $D_i$ value previously stored in the storage means; and signal processing means connected to the storage means to receive the largest $D_L$ signal, $D_m$, when $i = +N/2$ and to produce an output, L.E., indicative of $P(V_m/D_m + i_m)$ where P is a constant proportional to the distance between radiation detectors in the first and second plurality of radiation detectors, and $V_m$ and $i_m$ are the $V_i$ and i values when the $D_L$ value is equal to $D_m$.

2. Apparatus according to claim 1 wherein the storage means receives and stores the values $V_i$ and i associated with each output $D_i$ and, upon receipt of the output $D_L$ from the comparator means, stores the $V_i$ and i values ($V_i$ and $i_L$) associated with $D_L$ so that when $i = +N/2$ the signal processing means will also receive the $V_i$ and i values ($V_m$ and $i_m$) with which $D_m$ is associated.

3. Apparatus according to claim 1, further including motive means connected to the signal responsive means and to the lens means and operable to move the lens means in accordance with the output L.E.

4. Apparatus according to claim 2, further including motive means connected to the signal responsive means and to the lens means and operable to move the lens means in accordance with the output L.E.

5. The method for determining the direction and amount of lens of a camera should be moved in order to achieve the proper focus position with respect to a remote object which camera includes lens means that produces first and second radiation distribution patterns of the scene, and a plurality N of positionally corresponding radiation detector pairs, a first detector in each pair being identified as an a detector and the second detector in each pair being identified as a b detector and the detector pairs being mounted to receive radiation from the remote scene with the a detectors receiving radiation in the first radiation distribution pattern and the b detectors receiving radiation in the second radiation distribution pattern comprising the following steps:

Step 1—presenting the outputs from all of the a and b detectors to a memory for storage;

Step 2—shifting the outputs of the b detectors a number of positions with respect to the a positionally corresponding detectors in a first direction;

Step 3—determining a value $V_i$ from the shifted outputs of the b detectors and the outputs of the a detectors in accordance with the equation $$V_i = \sum_{n=1+\frac{i+|i|}{2}}^{(N-1)+\frac{i-|i|}{2}} |a_n - b_{n+1-i}| - |a_{n+1} - b_{n-i}| \quad (1)$$

where i represents the number of shifts of the b detector outputs with respect to the positionally corresponding a detector outputs;

Step 4—storing the value $V_i$ and the i value with which it is associated;

Step 5—shifting the b outputs one position in a direction opposite to the first direction with respect to the positionally corresponding a outputs;

Step 6—determining a new $V_i$ from the above equation (1) and storing the new $V_i$ and i values;

Step 7—subtracting the first and second $V_i$ values to obtain a first $D_i$ value;

Step 8—storing the value $D_i$ and the $V_i$ and i values with which it is associated;

Step 9—repeating Steps 5 through 8 to obtain a new $D_i$ value;

Step 10—comparing the old $D_i$ and the new $D_i$ value to determine which is largest and storing the largest $D_i$ value and the corresponding $V_i$ and i values with which it is associated;

Step 11—repeating Steps 5 through 10 until $i = +N/2$ at which time the largest D value, $D_m$, and the $V_i$ and i values with which it is associated ($V_m$ and $i_m$) are stored; and Step 12—determining the lens extension value from the equation $$L.E. = P(V_m/D_m + i_m)$$

where P is a constant representing the lens extension per shift.

6. The method of claim 3 further including the following step:

Step 13—presenting the resulting signal L.E. to a motive device to position the lens of the camera in a first direction or a second direction in accordance with the sign of L.E. and by an amount dependent on the size of L.E. so that it occupies the proper focus position.

7. Apparatus for use in an auto focus system which includes first plurality, N, of radiation detectors $A_1$, $A_2$, $A_3$ ... $A_n$ mounted in a first array with each detector operable to produce an output $a_1$, $a_2$, $a_3$ ... $a_n$ representative of the radiation received thereby, a second plurality of radiation detectors $B_1$, $B_2$, $B_3$ ... $B_n$ mounted in a second array with each detector operable to produce an output $b_1$, $b_2$, $b_3$ ... $b_n$ representative of the radiation received thereby, radiation transmissive means for transmitting radiation from a remote object so as to produce first and second radiation patterns at the first and second arrays respectively, when said radiation transmission means is in a first position relative to the remote object the first and second patterns produce substantially equal radiation on detectors having the same subscripts in the first and second arrays, when said radiation transmission means is in a position other than the first position relative to the remote object the first and second patterns change so that the detectors with the same subscripts in the first and second arrays normally receive different radiation, the improvement comprising:

shifting means connected to receive the outputs $a_1$, $a_2$, $a_3$ ... $a_n$ and $b_1$, $b_2$, $b_3$ ... $b_n$ and operable to produce an output signal in which the outputs $b_1$, $b_2$, $b_3$ ... $b_n$ are shifted with respect to the outputs $a_1$, $a_2$, $a_3$ ... $a_n$;

signal producing means connected to the shifting means and operable to produce a signal, i, causing consecutive shifts of the outputs $b_1$, $b_2$, $b_3$ ... $b_n$ from a first position to a second position;

first computer means connected to the shift means and to the signal producing means to receive the outputs therefrom and operable to produce an output signal $V_i$ for each value of i according to the equation $$V_i = \sum_{n=1+\frac{i+|i|}{2}}^{(N-1)+\frac{i-|i|}{2}} |a_n - b_{n+1-i}| - |a_{n+1} - b_{n-i}|$$

difference means connected to receive the output of the first computer means and operable to produce an output signal $D_i$ indicative of the difference between successive $V_i$ outputs from the computer means;

comparator means connected to the difference means to receive the $D_i$ signal therefrom and operable to produce an output signal $D_m$ indicative of the largest value of a $D_i$ signal received from the difference means; and second computer means connected to the comparator means to receive the $D_m$ signal and to produce an output signal, L.E. according to the equation L.E. = $P(V_m/D_m + i_m)$ where P is a constant and $V_m$ and $i_m$ are $V_i$ and i values used in obtaining $D_m$.

8. Apparatus according to claim 7 wherein the first computer means produces a second output indicative of the value i associated with $V_i$, the difference means receives both $V_i$ and i from the first computer means and produces second and third outputs $V_i$ and i respectively associated with $D_i$, the comparator means received $D_i$, $V_i$ and i from the difference means and produces second and third output signals $V_m$ and $i_m$ respectively and the second comparator means receives $D_m$, $V_m$ and $i_m$ from the comparator means.

9. Apparatus according to claim 7 further including motive means connected to the second computer means to receive the L.E. signal and operable to position the radiation transmissive means in accordance therewith.

10. Apparatus according to claim 8 further including motive means connected to the second comparator means to receive the L.E. signal and operable to position the radiation transmissive means in accordance therewith.

* * * * *